United States Patent [19]

Kaufmann

[11] 3,968,665

[45] July 13, 1976

[54] SLOTTED LOCKING DEVICE

[76] Inventor: Edward A. Kaufmann, 2785 N. Speer Blvd., Denver, Colo. 80211

[22] Filed: Aug. 23, 1974

[21] Appl. No.: 500,107

Related U.S. Application Data

[63] Continuation-in-part of Ser. No. 393,828, Sept. 4, 1973, Pat. No. 3,832,871, which is a continuation-in-part of Ser. No. 349,489, April 19, 1973, Pat. No. 3,841,119.

[52] U.S. Cl. .................................. 70/234; 70/13; 70/196; 70/203; 70/451
[51] Int. Cl.² .................. B62H 3/02; B62H 5/00; E05B 71/00
[58] Field of Search .................. 70/33, 34, 58, 196, 70/202, 203, 226, 227, 230, 234, 236, 360, 371, 13; 211/5

[56] References Cited
UNITED STATES PATENTS

| 608,464 | 8/1898 | Lewis | 211/5 |
|---|---|---|---|
| 636,629 | 11/1899 | Butcher | 70/234 X |
| 1,317,510 | 9/1919 | Lawrence | 70/227 |
| 1,965,941 | 7/1934 | Jacobi | 70/371 |
| 2,131,315 | 9/1938 | Dunseath | 70/371 X |
| 2,373,783 | 4/1945 | Schlifer | 70/371 X |
| 3,101,695 | 8/1963 | Honeyman | 70/58 |
| 3,151,898 | 10/1964 | Olander | 70/203 X |
| 3,759,072 | 9/1973 | McLarnon | 70/330 X |
| 3,802,232 | 4/1974 | Mattson et al. | 70/234 |
| 3,865,246 | 2/1975 | Lieb et al. | 211/5 |

OTHER PUBLICATIONS

Kasyan: "Security Key Lock"; Oct. 1973; from *Western Electric Technical Digest* No. 32, p. 25.

*Primary Examiner*—Paul R. Gilliam
*Assistant Examiner*—Carl F. Pietruszka

[57] ABSTRACT

A lockable securing device including a bifurcated body having a pair of outwardly extended, spaced, parallel arms. A slotted opening is formed between the arms. Transverse apertures are provided in the arms near their outer ends and are sized to receive a removable, axial locking device. The locking device has an extension member at one end which is arranged to extend across the slotted opening to block the opening and retain an object within the slot when the axial lock is inserted and retained within said body arms. In one embodiment the slotted lock is used to secure the frame of a bicycle to an anchored object to prevent unauthorized removal; another is a door handle.

3 Claims, 6 Drawing Figures

U.S. Patent  July 13, 1976  3,968,665
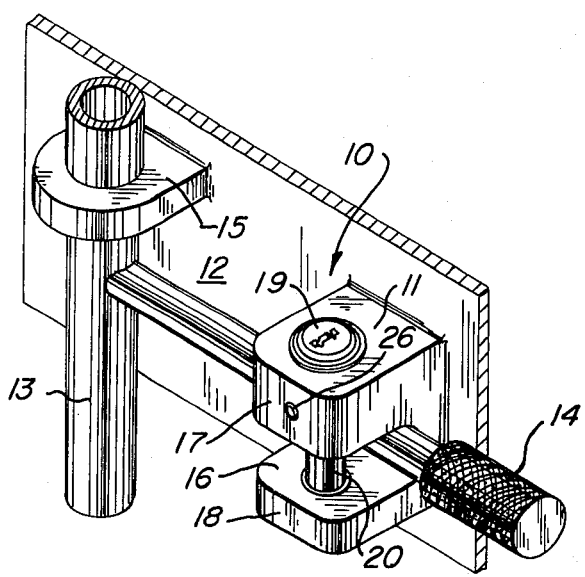
Fig_1
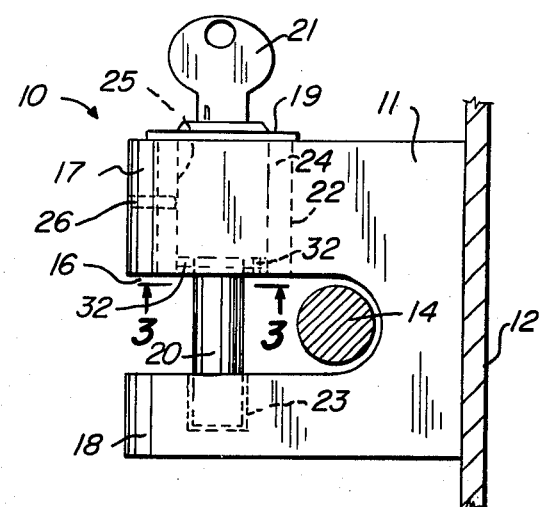
Fig_2
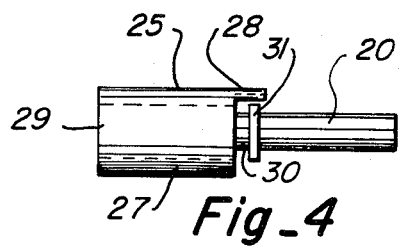
Fig_4
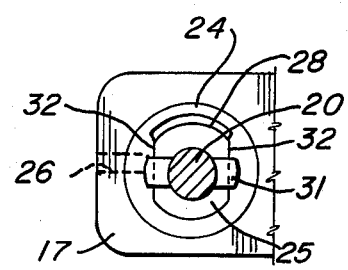
Fig_3
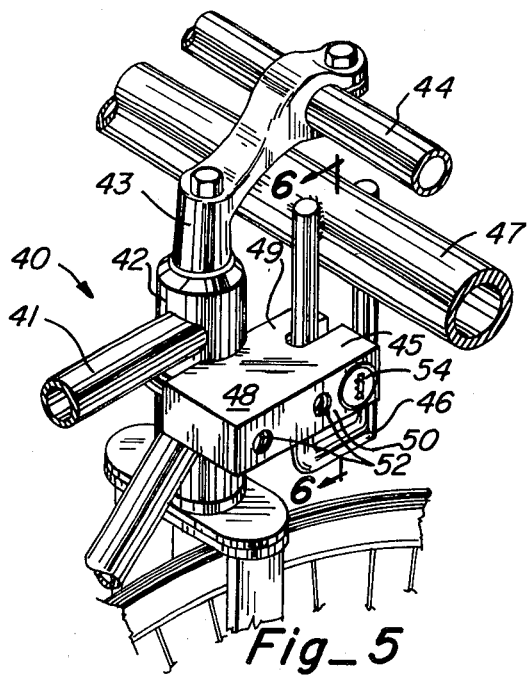
Fig_5
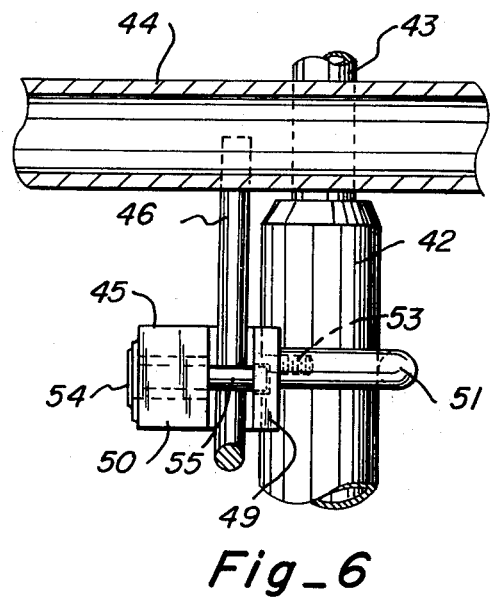
Fig_6

SLOTTED LOCKING DEVICE

This application is a continuation-in-part of my copending application Ser. No. 393,828, filed Sept. 4, 1973 to be U.S. Pat. No. 3,832,871, which is a continuation-in-part of my copending application, Ser. No. 349,489, filed Apr. 19, 1973, now U.S. Pat. No. 3,841,119.

BACKGROUND OF THE INVENTION

This invention is directed to a locking device in which a movable or removable, axial lock is positioned through a slotted body to close the opening of the slot to retain a member therein. It is more specificaly directed to a locking device wherein the axial lock has an end extension arranged to pass through a pair of aligned apertures on either side of a slotted opening to secure a handle or elongated member within the slot when the lock cylinder is inserted into permanently fastened lock barrel.

As is well known in the art, locking devices can take any number of shapes and configurations. When it comes to locking a member in position, such as the handle or the arm, usually the member is placed in the secured or retained position and a hasp is laid over the member and is retained in position by means of a common padlock. In most of these devices, a member is required to pivot or is hinged. In this way, the member is moved into position to retain the handle with the pivoting member inserted over a staple or ring through which the padlock is secured. The hinge pin, required to provide the pivotal action for the member, is usually a weak link and thus it is a simple matter to sever the pin to open the locking device without removing the padlock.

It is an object of the present invention to provide a lockable device for retaining a handle or object in a secured position with a minimum of parts required which are vulnerable to breakage or separation to provide an extremely secure device.

Another object of the present invention is to provide a locking device having a solid body with a pair of outwardly extending arms forming a slot therebetween and having an easily movable or removable locking member which can be inserted into the body so as to close the entrance to the slot to retain a member therein against removal.

Another object of the present invention is to provide an extremely simple and economical locking device which can be easily manufactured and installed.

A further object of the invention is to provide a rugged and durable locking device which is capable of securing an object such as a lever or handle to retain it in a locked position until such time as the handle is desired to be released for opening a member such as a door or cover.

A still further object of the present invention is to provide a locking device for bicycles which can be attached to the frame of the bicycle to secure the bicycle to a thin, anchored object which can be retained within the slotted opening of the body of the lock to prevent unauthorized removal of the bicycle.

SUMMARY OF THE INVENTION

A locking device is provided which includes a bifurcated body having a pair of outwardly extending arms spaced from each other to form a slot therebetween. A pair of transverse apertures are arranged near the ends of the arm members. It is to be understood that the arms can be arranged parallel, curved, twisted or any other configuration desired. A completely movable or removable cylindrical locking device, which can be actuated by a key or the like, and having an extension member or stud mounted at one end is used to effect the locking operation. The actual cylindrical or tumbler locking mechanism is of the conventional type and does not per se form a part of this invention.

One of the apertures is arranged to extend completely through an arm of the body and is sized to receive the barrel and cylinder mechanism of the locking device. The second aperture, coaxial with the first, is provided in the second arm and can extend partially or completely through the arm. This aperture is sized to receive the extension member of the locking device. Thus, when the locking cylinder is positioned within the first arm, the extension member crosses the slotted opening and thus blocks or closes the slot to prevent removal of any object which has been inserted therein.

The body is formed from a solid or hollow material, such as steel, aluminum, brass, synthetic resin or the like, and can be machined or molded to form the slotted opening and the aperture. The body can be mounted in proper position to any object such as a truck or freight car door, body of an automobile vehicle, or a bicycle frame. When the locking device, according to the present invention, is used to secure a bicycle to an object, the body is arranged with a semicircular cutout along one side and can use a U-bolt arrangement or the like. It is disposed to encircle the front wheel bearing housing or other portion of the frame of the bicycle with the parallel arms of the body extending outwardly away from the frame. Screws, recessed within the body and capable of being threaded into the ends of the U-bolt in a tightening direction only, can be provided to permanently secure the body of the locking device to the bicycle to prevent removal. The unit may, also, be an integral part of the bicycle frame.

Other objects of this invention will appear in the following description and the appended claims, reference being made to the accompanying drawings forming a part of the specification wherein like reference characters designate corresponding parts of the several views.

FIG. 1 is a perspective view of one form of the locking device, according to the present invention, showing the body of the locking device welded to the surface of the door panel with the actuating lever for the door retainer secured within the slot of the locking device;

FIG. 2 is a side elevation view of the locking device of FIG. 1, showing a actuating key inserted within the locking cylinder and the extension member closing the slotted opening;

FIG. 3 is an end view of the locking cylinder taken along the line 3—3 at FIG. 2;

FIG. 4 is a side elevation view of the locking cylinders showing the extension member;

FIG. 5 is a perspective view showing the locking device according to the present invention mounted on the front wheel bearing housing of a bicycle with an anchored object retained within the slot for securing the bicycle against unauthorized removal; and FIG. 6 is a front elevation view of the locking device taken along the line 6—6 of FIG. 5.

DETAILED DESCRIPTION

Turning now more specifically to the drawings, FIG. 1 shows the locking device 10 according to this invention having body 11 permanently and securely attached to the outer surface of a door 12 of a tractor trailer. As is well known, a rod 13 having a lever or handle 14 is mounted usually vertical in a plurality of pedestal mounted bearings 15. As is commonly understood, each end of the rod 13 usually incorporates devices which are used to close and secure the door 12 to the rear of the trailer. Thus, to lock the doors the handle 14 is used to rotate the rod 13 until the handle is in a position adjacent to the surface of the door 12 and inserted within the slotted opening of the body 11.

The body 11 of the locking device 10 includes outwardly extending, spaced, rigid arms 17, 18 which form a slotted opening 16 therebetween. A removable, axial type locking device 19, having an end extension 20, is inserted into the body 11 so that the extension 20 crosses the slotted opening 16 near its outer end and thus prevents the handle 14 from being pivotally rotated. Simply by actuating the locking mechanism by means of a key 21, combination knob or the like, the lock 19 with extension 20 can be moved outwardly or removed from the body 11 to release and free the handle 14.

A pair of transverse apertures 22, 23 aligned coaxially, are positioned in the arms 17, 18 respectively, near their outer ends. The locking device 19 includes the outer shell section 24 fitting in aperture 22 and inner, movable or removable section 25 fitting in the shell section 24. The aperture 22 is sized to snugly receive the outer shell 24 which is retained in position within the aperture 22 by means of a roll pin 26. It is to be understood that any type of retaining means can be used to securely, if not permanently, affix the outer shell 24 to the body 11. The thickness of the arm 16 can be designed so that it coincides with the length of the outer shell 24, although this dimension is not critical. It is required, however, that the length of the extension member 20 be sufficient to cross the slotted opening 16 and have its end enter aperture 23.

The inner locking section 25 of the lock device 19 includes a barrel or casing 27 having positioning tab 28 provided at its inner end, and rotatable section 29 which is within the casing 27 and is rotatable with respect thereto. The section 29 is provided with a tumbler or combination lock mechanism (not shown) which releasably permits the section 29 and barrel 27 to be rotated with respect to each other up to approximately 90°. At the inner end of the section 29 is provided a shaft 30 upon which is mounted a substantially rectangular locking cam 31 and coaxial extension member 20. The extension 20 can be threadably connected to the shaft 30 or it can be permanently brazed or welded to retain the extension 30 and cam 31 in place.

Any type of locking arrangement can be provided. The embodiment in FIG. 3 shows the outer shell 24 having inwardly extending lips 32 on each side of the opening provided for the inner, movable or removable section 25. Thus, the dimension between the lips 32 is narrower than the internal diameter of the outer shell 24. To secure the inner section 25 to the outer shell 24, the rotatable section 29 is rotated so that the legs of the cam 31 are aligned with the long dimension of the opening as shown in FIG. 3. The tab 28 is aligned to fit between the lips 32 upon insertion of the movable or removable inner section 25. Once seated within the outer shell 24, the rotatable section 29 is rotated approximately 90° in either direction so that the cam legs 31 overlap the lips 32 to prevent removal of the section 25. When locked in this manner, the extension member 20 closes the slotted opening 16 and retains the handle 14 or any other object within the slot 16 to prevent its removal.

In another embodiment, the locking device 10 as shown in FIG. 1 is used as a bicycle locking device to prevent theft or unauthorized removal. A bicycle 40, which has a frame 41, including front wheel bearing housing 42, gooseneck 43 and handlebars 44, is shown. The bicycle 40 is secured by means of a locking device 45 to a thin object 46 which is anchored to a pipe or other secured element 47. The bicycle lock 45 has body 48 and space, rigid arms 49, 50. The body 48 can be permanently attached to the bicycle front wheel bearing housing 42 or any other parts of the frame by means of welding, or it can be secured by means of a clamp device such as a U-bolt 51. The U-bolt is inserted into holes 52 provided in the body 48 and arranged so that the U-bolt 51 surrounds the front wheel bearing housing 42. Recessed screws 53 can be threaded into the ends of the U-bolt 51 so as to tightly secure the body 48 to the housing 42. The heads of the screws 53 are arranged so that they can be turned in a tightening direction only so that the U-bolt and lock body can not be removed from the bicycle 40. In this way, the locking device 45 can be securely, if not permanently, attached to the bicycle 40 to make it essentially a part of the frame 41 and can be arranged to extend forwardly or sidewardly from the frame.

A removable axial locking device 54 cis provided in the arms 49, 50 of the bicycle lock 45. The locking device 54 includes an extension member 55 which is arranged to cross the slotted opening between the arms 49, 50. The axial locking device 54 is the same as shown and described previously.

Thus, to secure the bicycle against unauthorized removal, the bicycle 40 with locking device 45 is positioned adjacent to an anchored object 46, loose ring, etc., so that the object is positioned in the slot. The locking device 54 is then inserted into the apertures provided with the extension member 55 crossing the slotted opening 56 and thus retaining the anchored object within the forwardly extending arms 49, 50. In this way, the bicycle 40 is securely retained by the anchored object until such time as the locking device 54 is moved or removed from the body 48, thus freeing the bicycle.

Although throughout this specification the locking device is described as having two outstanding arms, it is to be understood that this invention is intended to include the configuration wherein the arms can be formed by merely cutting or machining an elongated slotted opening from one edge of a body of material; thus, the portions of the body on each side of the slot would be considered the arms regardless of their actual thickness or shape. In addition, the body and arms can be formed from solid or hollow material.

While a locking device has been shown and described in detail, it is obvious that this invention is not to be considered to be limited to the exact form disclosed and that changes in detail and construction can be made therein within the scope of the invention without departing from the spirit thereof.

What is claimed is:

1. A bicycle locking device for securing a bicycle to an anchored elongated object, comprising:
   a. a body including a U-shaped clamp means positioned around the frame of a bicycle with the ends of said clamp firmly secured in said body, and having a pair of outwardly extending, rigid arms spaced from each other to form an open slot therebetween, said spaced arms include aligned transverse apertures arranged near the outer end of said arms, said body being fixedly attached to the frame of said bicycle;
   b. at least partially removable axial locking means arranged to be inserted into said apertures for releasably enclosing said anchored object between said spaced rigid arms, whereby said bicycle can be secured to prevent unauthorized removal; and
   c. said axial locking means includes a lockable cylinder and an extension member mounted at one end of said cylinder and an extension whereby when the locking means is inserted into said apertures, the extension member is disposed across the opening between said arms to prevent removal of the bicycle from said anchored object.

2. A bicycle locking device as defined in claim 1, wherein:
   the ends of said clamp means are inserted through spaced parallel holes in said body and secured with screws threaded into the ends of said clamp means, said screws having heads which permit turning in a tightening direction only to prevent removal of the locking device from the frame of said bicycle.

3. A bicycle locking device as defined in claim 1, wherein:
   said bicycle frame includes a front wheel bearing housing and said lock body is fixedly attached to said front wheel bearing housing and arranged so that the spaced arms extend forwardly and substantially beyond said housing.

* * * * *